United States Patent
Stabel et al.

(10) Patent No.: US 7,825,655 B1
(45) Date of Patent: Nov. 2, 2010

(54) INDUCTIVE PROXIMITY SENSORS AND HOUSINGS FOR INDUCTIVE PROXIMITY SENSORS

(75) Inventors: Eberhard Stabel, Stuttgart (DE); Carsten Elscher, Schlat (DE); Henry Menke, Florence, KY (US)

(73) Assignee: Balluff, Inc., Florence, KY (US)

( * ) Notice: Subject to any disclaimer, the term of this patent is extended or adjusted under 35 U.S.C. 154(b) by 393 days.

(21) Appl. No.: 12/125,528

(22) Filed: May 22, 2008

(51) Int. Cl.
*G01B 7/14* (2006.01)
(52) U.S. Cl. .......................... 324/207.15; 324/207.24
(58) Field of Classification Search .......... 324/207.15, 324/207.24
See application file for complete search history.

(56) References Cited

U.S. PATENT DOCUMENTS

| | | | |
|---|---|---|---|
| 3,634,799 A | 1/1972 | Strauch | |
| 4,408,159 A | 10/1983 | Prox | |
| 5,206,785 A | 4/1993 | Hukashima | |
| 5,224,383 A | 7/1993 | Pinto et al. | |
| 5,493,217 A | 2/1996 | Stahl et al. | |
| 5,504,425 A | 4/1996 | Fericean et al. | |
| 5,670,886 A | 9/1997 | Wolff et al. | |
| 6,734,665 B2 | 5/2004 | Jagiella et al. | |
| 7,159,465 B2 | 1/2007 | Aizawa | |
| 2003/0038635 A1 | 2/2003 | McQueency et al. | |
| 2007/0001667 A1 | 1/2007 | Kirchdoerffer et al. | |
| 2007/0107207 A1 | 5/2007 | LaClair et al. | |
| 2007/0271780 A1 | 11/2007 | Allemann et al. | |

FOREIGN PATENT DOCUMENTS

EP    1837149 A1    9/2007

*Primary Examiner*—Reena Aurora
(74) *Attorney, Agent, or Firm*—Dinsmore & Shohl LLP

(57) ABSTRACT

An inductive proximity sensor includes a sensor housing, a sensing coil and an evaluation circuit. The sensor housing may generally include a sensing portion and a body portion. The evaluation circuit may be electrically coupled to the sensing coil and disposed in the body portion. The sensing coil may be positioned in the sensing portion such that the sensing coil is recessed from an outer edge of the sensor housing by a protective annulus disposed between the sensing coil and the outer edge. The sensing coil may be spaced from the sensor housing by a zone having low magnetic permeability relative to the sensor housing disposed between the sensing coil and the sensor housing. The zone may extend circumferentially around the sensing coil. A protective plate may be disposed between the outer edge of the sensor housing and the sensing coil and recessed from the outer edge of the housing.

20 Claims, 5 Drawing Sheets

INDUCTIVE PROXIMITY SENSORS AND HOUSINGS FOR INDUCTIVE PROXIMITY SENSORS

TECHNICAL FIELD

The present invention generally relates to inductive sensors and, more specifically, to inductive proximity sensors and housings in which inductive proximity sensors are packaged.

BACKGROUND

Inductive proximity sensors may be employed in a variety of applications to sense the distance of an adjacent object such as an electrically conducive or magnetizable object. As the object comes into range of the inductive proximity sensor, the material of the object disrupts and/or changes the magnetic field of the sensor which, in turn, causes a change in the current used to generate the magnetic field. The change in the current may be generally related to the distance the object is from the sensor. Accordingly, by measuring the change in the current the distance of the object from the inductive proximity sensor may be determined. Such inductive sensors are particularly useful in welding processes including automated welding processes.

In order to maximize the sensing range of the inductive proximity sensor, it is common practice to package the inductive proximity sensor in a thin metal housing with a diameter only slightly larger than the diameter of the inductive sensing coil such that only a minimal amount of metal is proximate the inductive sensing coil. This is because the metal of the housing may adversely impact the sensing range of the inductive proximity sensor by attenuating the magnetic field of the coil. Accordingly, the less metal that is used in the housing, the greater the sensing distance of the inductive sensing coil. However, such inductive proximity sensors are subject to damage and frequent failures as the thin metal housing does not sufficiently protect the inductive sensing coil from mechanical impact. As a result, the inductive proximity sensors must be frequently repaired and/or replaced due to damage to the inductive proximity sensor. The cost of repairing and replacing the inductive proximity sensors, in addition to production and/or manufacturing downtime caused by sensor failures, and/or damage may significantly increase manufacturing costs and, as a result, the cost of goods manufactured using inductive proximity sensors.

Accordingly, a need exists for improved inductive proximity sensors.

SUMMARY

In one embodiment, an inductive proximity sensor includes a sensor housing, a sensing coil and an evaluation circuit. The sensor housing may generally include a sensing portion and a body portion. The evaluation circuit may be electrically coupled to the sensing coil and disposed in the body portion of the sensor housing. The sensing coil may be positioned in the sensing portion of the sensor housing such that the sensing coil is recessed from an outer edge of the sensor housing by a protective annulus disposed between the sensing coil and the outer edge of the sensor housing. The sensing coil may also be positioned in the sensing portion of the sensor housing such that the sensing coil is spaced from the sensor housing by a zone having low magnetic permeability relative to the sensor housing disposed between the sensing coil and the sensor housing. The zone having low magnetic permeability may extend circumferentially around the sensing coil. Spacing the sensing coil from the sensor housing improves the sensing distance of the sensing coil thereby facilitating the use of a more robust sensor housing.

In another embodiment, an inductive proximity sensor may include a sensor housing, a sensing coil and an evaluation circuit. The sensor housing may include a sensing portion and a body portion. The evaluation circuit may be electrically coupled to the sensing coil and positioned in the body portion of the housing. The sensing coil may be positioned in the sensing portion of the sensor housing such that the sensing coil is recessed from an outer edge of the sensor housing by a protective annulus disposed between the sensing coil and the outer edge of the sensor housing. The protective annulus may be provided with a seat recessed from the outer edge of the sensor. The sensing coil is spaced apart from the sensor housing by a zone having low magnetic permeability relative to the sensor housing disposed between the sensing coil and the sensor housing and extending circumferentially around the sensing coil. A protective plate may be positioned in the seat of the protective annulus such that the protective plate is recessed from the outer edge of the sensor housing and disposed between the outer edge of the sensor housing and the sensing coil. A polymeric barrier may be disposed between the protective plate and the sensing coil.

In yet another embodiment, an inductive proximity sensor for use in conjunction with welding applications includes a sensor housing, a sensing coil and an evaluation circuit. The sensor housing may be substantially cylindrical in shape and may be integrally formed with a body portion disposed between a sensing portion and a connector portion wherein the body portion, the sensing portion and the connector portion extend along a longitudinal axis and are concentric about the longitudinal axis. The connector portion may include an isolation sleeve extending longitudinally into the body portion. The evaluation circuit may be electronically coupled to the sensing coil and mechanically engaged with the isolation sleeve such that the evaluation circuit may be fixed into position in the body portion. The sensing coil may be mechanically engaged with the evaluation circuit thereby positioning the sensing coil in the sensing portion of the sensor housing. The sensing coil may be positioned in the sensing portion of the sensor housing such that the sensing coil is recessed from an outer edge of the sensor housing by a protective annulus disposed between the sensing coil and the outer edge of the sensor housing wherein the protective annulus is provided with a seat recessed from the outer edge of the sensor. The sensing coil may be spaced apart from the sensor housing by a zone having low magnetic permeability relative to the sensor housing disposed between the sensing coil and the sensor housing and extending circumferentially around the sensing coil. A ceramic cap may be positioned in the seat of the protective annulus such that the ceramic cap is recessed from the outer edge of the sensor housing and disposed between the outer edge of the sensor housing and the sensing coil. A polymeric cup may be disposed between the ceramic cap and the sensing coil.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE ILLUSTRATIVE EMBODIMENTS

Figure 1:
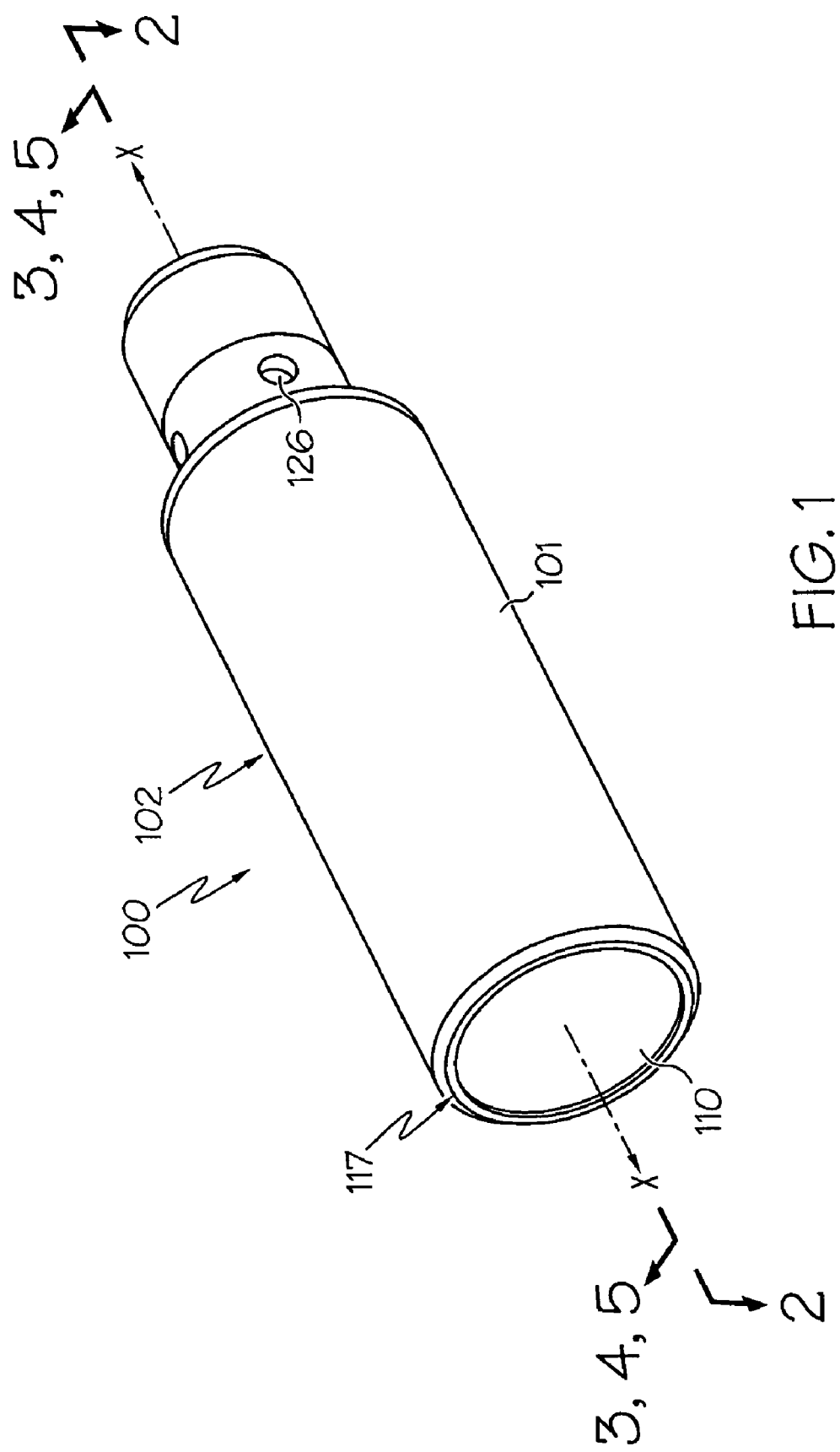
FIG. 1 depicts a perspective view of an inductive proximity sensor according to one embodiment described herein.

FIG. 1 generally depicts an inductive proximity sensor comprising a sensing coil and an evaluation circuit disposed in a sensor housing. The sensing coil is positioned in the sensing portion of the inductive proximity sensor such that the sensing coil is spaced apart from the sensor housing thereby optimizing the active sensing distance of the inductive proximity sensor while protecting the sensor coil from mechanical impact and damage which may adversely affect the operation of the inductive proximity sensor. Each of these elements and the construction of inductive proximity sensor will be described in more detail herein.

Figure 2:
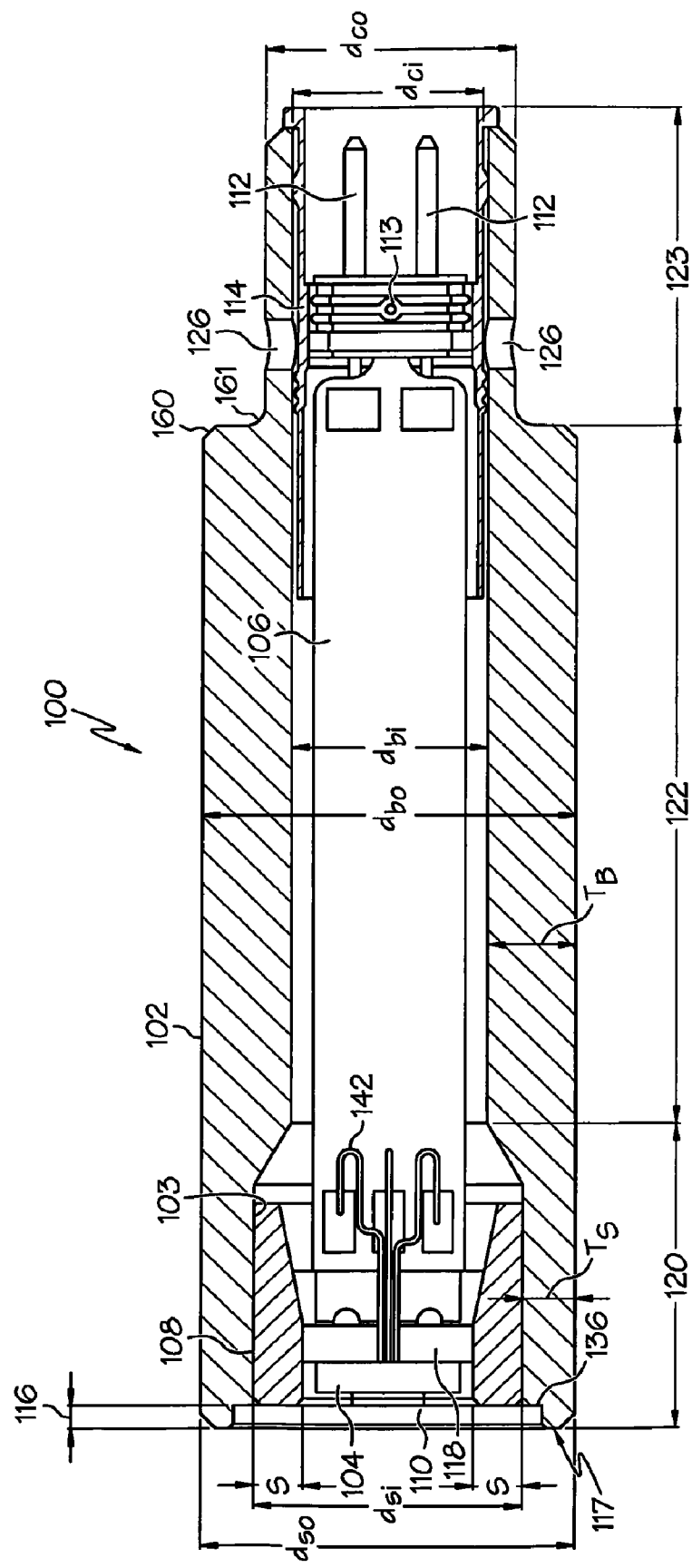
FIG. 2 depicts a cross-sectional view of the inductive proximity sensor of FIG. 1.

Referring now to FIGS. 1-2, the inductive proximity sensor 100 may generally comprise a sensor housing 102 extending along a longitudinal axis x. The sensor housing 102 may generally be rotationally symmetric about the longitudinal axis such as when the sensor housing 102 is a cylinder or has a generally cylindrical configuration as depicted in FIG. 1. The sensor housing 102 may comprise material suitable for use in conjunction with an inductive sensor such as non-magnetic metallic materials including brass, stainless steel, aluminum and the like. In one embodiment, the exterior surface 101 of the sensor housing 102 may comprise a substantially smooth surface, as shown in FIG. 1. In another embodiment (not shown), the exterior surface 101 of the sensor housing 102 may be threaded, such that the inductive proximity sensor 100 may be attached to a bracket or other positioning or securing device.

In either case, the exterior surface 101 of the sensor housing 102 may be coated with a non-stick material including, without limitation, fluoropolymers such as polytetrafluoroethylene (PTFE), perfluoroalkoxy (PFA), fluorinated ethylene polypropylene (FEP) or the like.

Generally, for ease of reference, the sensor housing 102 of the inductive proximity sensor 100 may be referred to in three portions: a sensing portion 120, a body portion 122 and a connector portion 123 with the body portion 122 disposed between the sensing portion 120 and the connector portion 123 (e.g., see FIG. 2). In one embodiment, the connector portion 123 may be a rigid connector, as depicted in FIGS. 1-5 while in another embodiment (not shown) the connector portion may comprise a flexible, cable connector extending from the body portion 122. To further clarify the relative orientation of various components of the inductive proximity sensor 100, the portion of the sensor housing 102 comprising the sensing portion 120 may be described as the anterior of the of the inductive proximity sensor 100 while the portion of the sensor housing 102 comprising the connector portion 123 may be described as the posterior of the inductive proximity sensor 100.

While the sensor housing 102 may be described in terms of three portions, it should be understood that the sensor housing 102 may be generally constructed as a single, unitary piece. Accordingly, no particular limitation is intended when referring to the sensor housing 102 in three portions.

Still referring to FIGS. 1-2, in one embodiment, the connector portion 123 of the inductive proximity sensor 100 extends from and is integral with the posterior of the body portion 122. In the embodiment shown in FIGS. 1-2, the connector portion 123 has an outer diameter $d_{co}$ which is less than the outer diameter $d_{bo}$ of the body portion 122. In one embodiment, the outer diameter $d_{co}$ of the connector portion 123 is that of a standard M12 sensor housing (12 mm) while the outer diameter $d_{bo}$ of the body portion 122 is that of a standard M18 sensor housing (18 mm). However, it should be understood that these dimensions are exemplary in nature and that the outside diameters $d_{bo}$, $d_{co}$ may be of any suitable dimension. Further, the inner diameter $d_{ci}$ of the connector portion 123 is substantially the same as the inner diameter $d_{bi}$ of the body portion 122. Accordingly, to facilitate the transition from the outer diameter $d_{bo}$ of the body portion 122 to the outer diameter $d_{co}$ of the connector portion 123, the body portion 122 may be provided with a shoulder 160 and fillet 161. While FIGS. 1-2 depict the connector portion 123 as having an outer diameter $d_{co}$ less than the outer diameter $d_{bo}$ of the body portion 122, it should be understood that the outer diameter $d_{co}$ of the connector portion 123 may be substantially the same as the outer diameter $d_{bo}$ of the body portion 122.

The connector portion 123 may comprise one or more holes 126 disposed around the connector portion 123 and extending through the thickness of the connector portion 123. The holes 126 facilitate adjustment and tuning of the evaluation circuit 106. The holes 126 also permit light from an indicator light (not shown), such as an led light or similar device mounted on the evaluation circuit 106, to be visible from outside the sensor housing 102. An isolation sleeve 114 may be press fit into the connector portion 123 such that the isolation sleeve 114 is frictionally engaged with the connector portion 123. The isolation sleeve 114 may be used to mechanically fix the position of the evaluation circuit 106 relative to the body portion 122 and to electrically insulate the evaluation circuit 106 from the sensor housing 102. Accordingly, the isolation sleeve 114 may comprise an electrically insulating material such as a plastic, ceramic or any other material suitable for electrically insulating the evaluation circuit 106 from the sensor housing 102 as will be apparent to one skilled in the art.

The body portion 122 of the inductive proximity sensor 100 extends along the longitudinal axis between the sensing portion 120 and the connector portion 123 with the sensing portion 120 disposed at the anterior of the body portion 122 and the connector portion 123 disposed at the posterior of the body portion 122. The body portion 122 is generally concentric with the connector portion 123 on the longitudinal axis and may be generally cylindrical in shape. The body portion 122 may have an outside diameter $d_{bo}$ and an inside diameter $d_{bi}$ with a wall thickness of $T_b$. In one embodiment, the outside diameter $d_{bo}$ of the body portion 122 is that of a standard M18 sensor housing (18 mm) while the inside diameter $d_{bi}$ is about 9.4 mm. However, it should be understood that these dimensions are exemplary in nature and that the inside and outside diameters $d_{bi}$, $d_{bo}$ of the body portion 122 may be of any suitable dimension as will be apparent to one skilled in the art.

As shown in FIG. 2, an evaluation circuit 106 may be positioned in the body portion 122 of the inductive proximity sensor 100. The evaluation circuit 106 may generally comprise various electronic components (not shown), such as resistors, capacitors and semiconductor components, which are arranged on a carrier board, such as a printed circuit board, and are connected to one another by conductive tracks (not shown) disposed along the carrier board to realize the desired switching functions of the inductive proximity sensor 100. For example, the evaluation circuit 106 may comprise various electronic components arranged and interconnected to form function groups which facilitate the operation of the inductive proximity sensor. In one embodiment, the function groups may generally comprise an oscillator function group, a demodulator function group, a trigger function group, and an output driver function group. In another embodiment, the evaluation circuit may comprise an oscillator and evaluation circuit as disclosed in U.S. Pat. No. 5,504,425 assigned to Gebhard Balluff Fabrik feinmachanischer Erzeugniss GmbH & Co. entitled "INDUCTIVE SENSOR RESPONSIVE TO THE DISTANCE TO A CONDUCTIVE OR MAGNETIZABLE OBJECT," which is incorporated herein by reference.

The evaluation circuit 106 may be disposed in the body portion 122 of the inductive proximity sensor 100 and extend longitudinally along the body portion 122. To secure the evaluation circuit 106 in the sensor housing 102, the evaluation circuit 106 may be mechanically engaged with the isolation sleeve 114 as discussed hereinabove. Connecting pins 112 may be soldered to the evaluation circuit 106 and extend through the connector body 113 and into the connector portion 123 to facilitate the electrical connection of the inductive proximity sensor 100 with a power source (not shown), a controller (not shown) and the like. In addition to being mechanically engaged with the isolation sleeve 114, the evaluation circuit 106 may also be secured in the body portion 122 of the sensor housing 102 using an insulating electronic potting material, as is commonly known in the art.

Still referring to FIGS. 1-2, the sensing portion 120 of the inductive proximity sensor 100 is disposed along the longitudinal axis on the anterior of the of the body portion 122. As depicted in FIGS. 1-2, the sensing portion 120 may be generally cylindrical in shape and has an outer diameter $d_{so}$, an inner diameter $d_{si}$ and a wall thickness $T_s$. However, it should be understood that the sensing portion 120 may be square or any other geometrical configuration. The sensing portion 120 is generally concentric with the body portion 122 and the connector portion 123 along the longitudinal axis. The outer edge 117 of the sensing portion (which is also the outer edge 117 of the sensor housing 102) may be provided with a seat 136 extending around the inner diameter $d_{si}$ of the sensing portion 120 and offset from the outer edge 117 of the sensor housing 102 such that the sensing coil 104 and a protective plate, such as a ceramic cap 110 (discussed in more detail herein), may be recessed from the outer edge 117 of the sensing portion 120. By recessing the sensing coil 104 and protective plate from the outer edge 117, the sensing portion 120 may also be provided with a protective annulus 116 integral with the outer edge 117 of the sensing portion 120. The protective annulus 116 extends around the outer diameter $d_{so}$ of the sensing portion 120 and is integral and continuous with the exterior surface 101 of the sensor housing 102. The protective annulus 116 protects the protective plate and sensing coil 104 from impact which may damage the protective plate and/or the sensing coil 104.

As shown in FIG. 2, a sensing coil 104 wound around a coil core 118 may be disposed in the sensing portion 120 of the inductive proximity sensor 100. The sensing coil 104 may comprise copper wire wound around a coil core 118 such as a ferrite core, a plastic core, a coil former, a bobbin, or the like. In another embodiment (not shown) the sensing coil may comprise one or two coils, each with an air core, disposed on a printed circuit board, as disclosed in U.S. Pat. No. 6,734,665 assigned to Balluff GmbH entitled "INDUCTIVE SENSOR HAVING A SENSOR COIL IN THE FORM OF A STRUCTURED CONDUCTIVE LAYER," which is incorporated herein by reference. In another embodiment (not shown) the sensing coil may comprise a structured conductive layer disposed on a printed circuit board which is also disclosed in U.S. Pat. No. 6,734,665. Regardless of the type of sensing coil and/or core used, the sensing coil may be electrically coupled to the evaluation circuit 106 by the coil connection 142.

The sensing coil 104 is generally concentric with the longitudinal axis of the inductive proximity sensor 100 with the plane of the sensing coil 104 substantially perpendicular to the longitudinal axis. In addition, the inventors have found that by spacing the sensing coil 104 apart from the sensor housing 102, thereby un-shrouding the coil and creating a zone S having low magnetic permeability circumferentially surrounding the sensing coil 104, the effective sensing distance of the inductive proximity sensor 100 may be increased. More specifically, the zone S between the sensing coil 104 and the sensor housing 102 has low magnetic permeability relative to the sensor housing 102 thereby reducing the attenuation of the magnetic field produced by the sensing coil 104 which, in turn, increases the flux density of the magnetic field produced by the inductive proximity sensor and improves the effective sensing distance of the inductive proximity sensor 100. When the magnetic field is described in terms of magnetic flux lines extending from the sensing coil 104, the zone of relatively low magnetic permeability permits magnetic flux lines entering or exiting the posterior side of the sensing coil 104 to travel substantially parallel to the longitudinal axis between the sensing coil and the sensor housing, with little or no attenuation, before exiting the inductive proximity sensor. The un-attenuated magnetic field has the effect of improving the sensing distance of the inductive proximity sensor. For example, the inventors have discovered that, by providing a zone S between the sensing coil 104 and the sensor housing 102 having low magnetic permeability compared to the sensor housing, the effective sensing distance of the inductive proximity sensor may be increased by about 30%-50%. In one specific example, a standard M12 sensing coil was positioned in a larger M18 sensor housing. The relatively small diameter coil positioned in the relatively large diameter sensor housing produced a zone S comprising an air gap between the sensing coil and the sensor housing extending circumferentially around the sensing coil which resulted in a 33% increase in the sensing distance of the inductive proximity sensor.

The increased sensing distance due to the zone S having low magnetic permeability relative to the sensor housing disposed between the sensing coil 104 and the sensor housing 102 may be used to create a more mechanically robust inductive proximity sensor relative to a standard inductive proximity sensor without a the zone. For example, the increased sensing distance permits the use of a sensor housing having a greater wall thickness thereby improving the overall durability of the inductive proximity sensor without sacrificing or diminishing the sensing distance of the inductive proximity sensor. Further, the improvement in the sensing distance also facilitates the sensing coil 104 being recessed further into the sensing portion 120 of the in the sensor housing 102 thereby forming the protective annulus 116 between the sensing coil 104 and the outer edge 117 of the sensor housing without sacrificing or diminishing the sensing distance of the sensor. Recessing the sensing coil 104 into the housing prevents damage to the sensing coil, particularly damage to the edge of the sensing coil, which may adversely effect performance of the sensor. Recessing the sensing coil 104 in the sensor housing 102 also permits any protective plate or cover placed over the sensing coil to be similarly recessed thus reducing the possibility that the protective plate may become similarly damaged. Finally, as discussed in more detail herein, the improvement in the sensing distance also facilitates the use of a protective plate, such as a ceramic cap 110 used with or without a polymeric cap 128, disposed over the sensing coil 104. Due to the improved sensing distance of the sensing coil, the thickness of the protective plate and/or the thickness of the polymeric cap 128 may be increased without diminishing the sensing distance of the inductive proximity sensor thereby creating a more mechanically robust sensor.

In one embodiment, to facilitate the zone S having low magnetic permeability between the sensing coil 104 and the sensor housing 102, the diameter of the sensing coil 104 may be selected to be smaller than the inner diameter $d_{si}$ of the sensing portion 120 of the inductive proximity sensor 100. In another embodiment, the inner diameter $d_{si}$ of the sensing portion 120 is increased such that the inner diameter $d_{si}$ of the sensing portion 120 is substantially greater than the inner diameter $d_{bi}$ of the body portion while the outer diameter $d_{so}$ of the sensor portion 120 remains substantially the same as the outer diameter $d_{bo}$ of the body portion 122, as shown in FIG. 2. This effectively reduces the wall thickness $T_s$ in the sensing portion 120 to less than the wall thickness $T_b$ of the body portion 122. In yet another embodiment, the inner diameter $d_{si}$ of the sensing portion 120 is increased such that the inner diameter $d_{si}$ of the sensing portion 120 is substantially greater than the inner diameter $d_{bi}$ of the body portion 122 and the diameter of the sensing coil 104 is selected to be smaller than the inner diameter $d_{si}$ of the sensing portion 120. For example, the inductive proximity sensor 100 may comprise the sensing coil and evaluation circuit of a standard M12 sensor disposed in the relatively larger diameter sensor housing of an M18 sensor. While having the outer diameter $d_{bo}$ of a standard M18 housing, the wall thickness of the housing may be increased thereby providing for a more robust housing compared to a standard M18 or M12 housing while being compatible with standard M18 fixturing devices. The increased interior diameter of the M18 sensor housing relative to the diameter of the M12 sensing coil permits the sensing coil to be positioned in the sensor housing such that the M12 sensing coil is spaced apart from the sensor housing thereby providing a zone S (in this case an air gap) having low magnetic permeability with respect to the sensor housing between the sensing coil and the sensor housing. The M12 evaluation circuit may then be re-tuned to accommodate for the different dimensions and positioning in the M18 housing.

While specific reference is made herein to disposing a standard M12 sensing coil and evaluation circuit in a housing having the outer dimensions of a standard M18 housing, it should be understood that the same effect (e.g., spacing the sensing coil apart from the sensor housing to create the zone S having low magnetic permeability relative to the sensor housing around the sensing coil to improve sensing distance) may be achieved by incorporating a standard sensing coil and evaluation circuit intended for use in a relatively smaller housing into a relatively larger housing. For example, an M8 sensing coil and evaluation circuit may be positioned in a housing having the outer dimensions of an M12 sensor housing or a standard M18 sensing coil and evaluation circuit may be positioned in a housing having the outer dimensions of an M30 sensor housing to create a low magnetic permeability zone surrounding the sensing coil. Moreover, while specific reference is made herein to the use of standard size inductive proximity sensor components (e.g., M8, M12, M18 and M30 inductive proximity sensor components) it should be understood that various other combinations of non-standard or custom sensing coils, evaluation circuits and sensor housings may be used to achieve improved sensing distance so long as the sensing coil is spaced apart from the sensor housing to create a low magnetic permeability zone between the sensing coil and the sensor housing.

Figure 3:
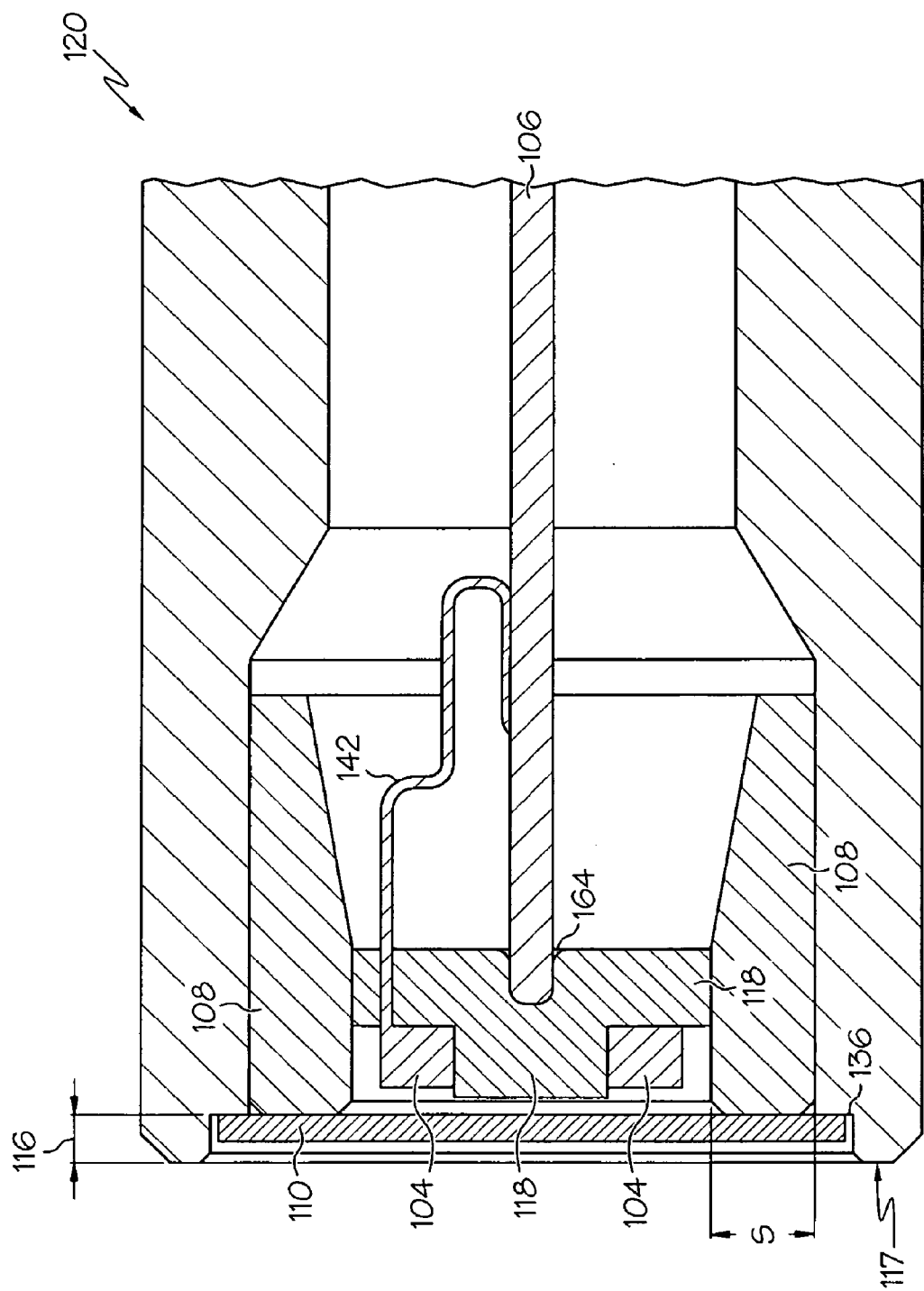
FIG. 3 depicts a close up view of a cross section of the sensing portion of an inductive proximity sensor according to one embodiment of the inductive proximity sensor shown and described herein.
Figure 4:
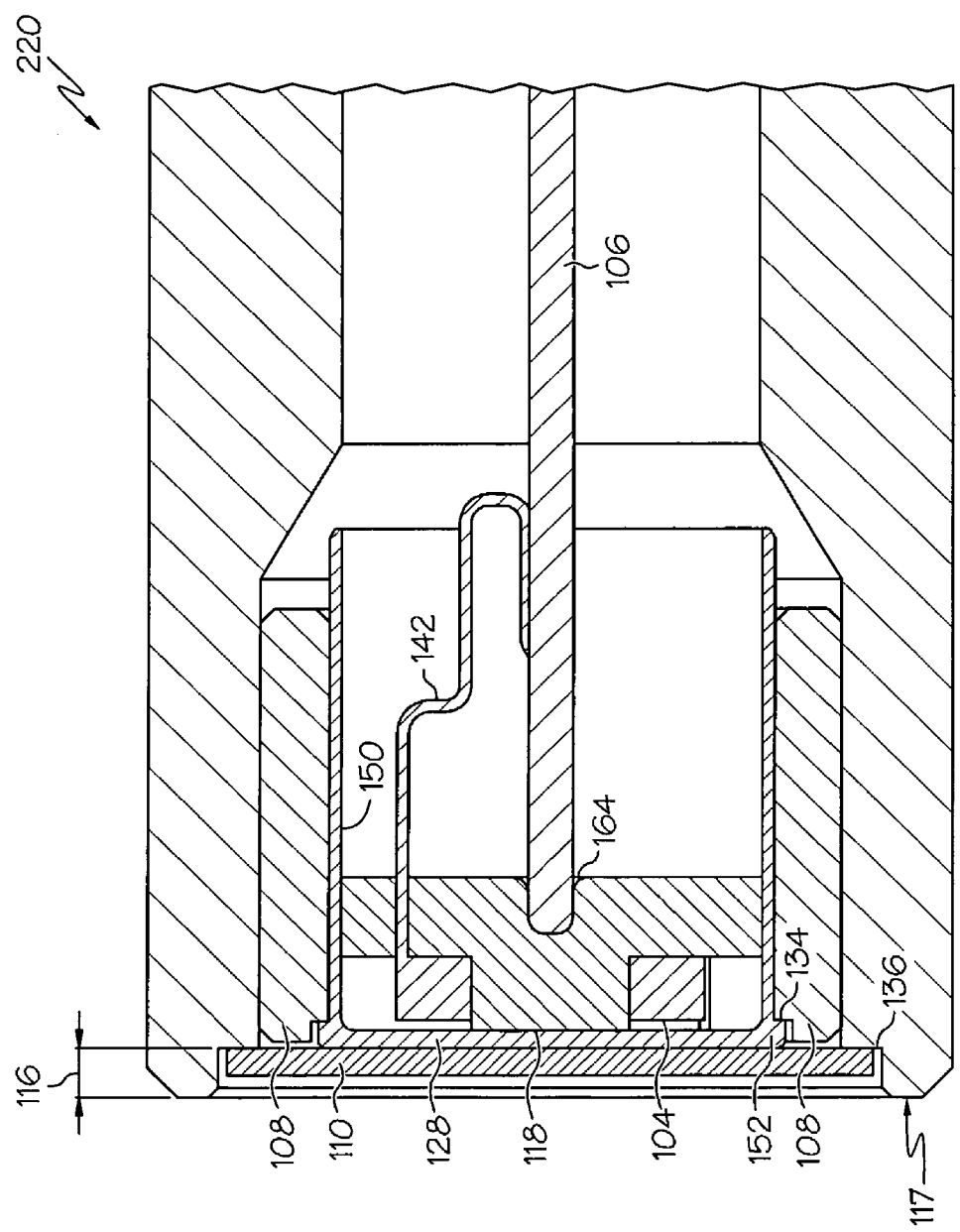
FIG. 4 depicts a close up view of a cross section of the sensing portion of an inductive proximity sensor according to another embodiment of the inductive proximity sensor shown and described herein.
Figure 5:
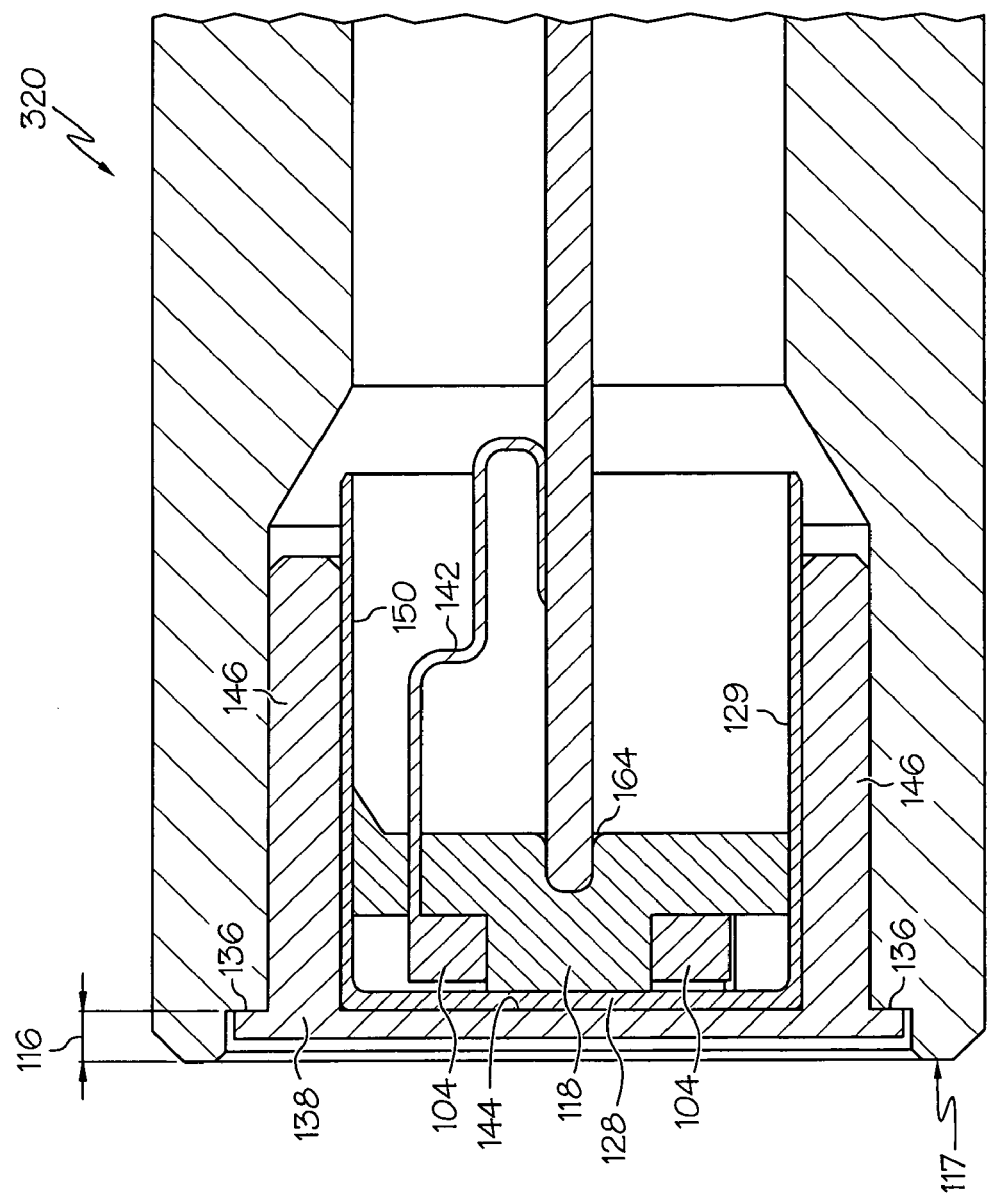
FIG. 5 depicts a close up view of a cross section of the sensing portion of an inductive proximity sensor according to another embodiment of the inductive proximity sensor shown and described herein.

Regardless of the method used to create the zone S having low magnetic permeability relative to the sensor housing between the sensing coil and the housing 102 of the inductive proximity sensor 100, the sensing coil 104 may be disposed in the sensor housing 102 such that the sensing coil 104 is concentric with the longitudinal axis of the inductive proximity sensor 100 with the plane of the sensing coil 104 being generally perpendicular to the longitudinal axis. To fix the sensing coil into place, the sensing coil may be mechanically attached to the evaluation circuit 106, as shown in FIGS. 3-5. For example, as shown in FIGS. 3-5, the coil core 118 may be provided with a slot 164. The evaluation circuit 106 may be disposed in the slot 164 thereby providing mechanical support to the sensing coil 104 and maintaining the positioning and spacing of the sensing coil 104 relative to the sensor housing 102. In one embodiment (not shown), where the sensing coil 104 is mechanically attached to the evaluation circuit 106, the sensing coil 104 may be spaced apart from the sensor housing such that the zone S having low magnetic permeability relative to the sensor housing comprises an air gap between the sensing coil 104 and the sensor housing 102. In another embodiment (not shown), the zone S may be filled with electronic potting material such that the sensing coil 104 is permanently fixed or suspended relative to the sensor housing 102. In yet another embodiment, the zone S between the sensor coil 104 and the sensor housing may be created by the use of a spacer 108 disposed between the sensor coil 104 and the sensor housing 102, as shown in FIG. 2 and described in more detail herein.

Referring now to FIGS. 3-5, the spacer 108 may comprise a cylinder of non-metallic material disposed in the sensing portion 120 of the inductive proximity sensor 100. The spacer 108, shown in cross section in FIGS. 3-5, may be positioned between the sensing coil 104 and the sensor housing 102 and may comprise a ceramic, plastic or other non-metallic material. The spacer 108 may have a wall thickness substantially the same as the width of the zone S or relatively low magnetic permeability such that the sensing coil 104 is spaced apart from the sensor housing by the zone S around the entire circumference of the sensing coil 104. The spacer 108 may be press-fit into the sensing portion 120 of the inductive proximity sensor 100 such that the spacer 108 is frictionally engaged with the interior surface 103 of the sensor housing 102. Alternatively, the spacer 108 may be attached to the interior surface 103 of the sensor housing 102 by applying an epoxy or similar adhesive between the spacer 108 and the interior surface 103 of the sensor housing 102.

Still referring to FIGS. 3-5, to prevent damage to the sensing coil 104, the inductive proximity sensor 100 may also comprise a protective plate positioned over the anterior surface (e.g., the surface of the sensing coil 104 facing away from the evaluation circuit 106) of the sensing coil 104. In the embodiments shown in FIGS. 3-4, the protective plate may be a ceramic cap 110 positioned over the anterior surface of the sensing coil 104 and proximate the protective annulus 116. The ceramic cap 110 may be substantially disk-shaped and may comprise alumina ($Al_2O_3$), zirconia ($ZrO_2$) or a similar a ceramic material or composition of ceramic materials as will be apparent to one skilled in the art. In one embodiment, the ceramic cap 110 may be a laminated ceramic cap comprising multiple layers of ceramic material joined together using an epoxy or similar adhesive material to improve the mechanical strength of the ceramic cap 110. In another embodiment, the ceramic cap 110 may comprise a ceramic material reinforced with carbon fiber and/or glass fiber to improve the mechanical strength of the ceramic cap 110. In yet another embodiment, the protective plate may comprise, for example, a polymer or duromer material.

To attach the ceramic cap 110 to the housing, the ceramic cap 110 may be positioned in the seat 136 and recessed from the protective annulus 116 of the sensing portion 120, as shown in FIGS. 2-5. The ceramic cap 110 may be affixed to the seat 136 by an adhesive, such as an epoxy or similar adhesive, applied between the ceramic cap 110 and the seat 136. When the inductive proximity sensor 100 includes a spacer 108 to maintain the space between the sensing coil 104 and the sensor housing 102, the ceramic cap 110 may also be affixed to the spacer 108 with the same adhesive used to attach the ceramic cap 110 to the seat 136.

Referring now to one embodiment of the sensing portion 320 shown in FIG. 5, embodiment, when the sensing portion 320 comprises a spacer to maintain the distance between the sensing coil 104 and the sensor housing 102 and the spacer comprises a ceramic material, the spacer and the ceramic cap may be integrally formed thereby forming an integrated cap/spacer 138 as depicted in FIG. 5. The integrated cap/spacer 138 is generally U-shaped in cross section and may comprise a cap portion 144 and a spacer portion 146. The cap portion 144 of the integrated cap/spacer 138 may be affixed to the seat 136 of the protective annulus 116 such that the integrated cap/spacer 138 is recessed from the outer edge 117 of the sensor housing 102. In addition, the spacer portion 146 of the integrated cap/spacer may be affixed to the sensor housing 102 using epoxy or a similar adhesive as will be apparent to one skilled in the art.

Referring now to another embodiment of the sensing portion 220 shown in FIG. 4, the sensing portion 220 may also comprise a polymeric barrier disposed between the ceramic cap 110 and the sensing coil 104. The polymeric barrier provides an additional protective barrier between the ceramic cap 110 and the sensing coil 104 in the event that the ceramic cap 110 should become cracked, broken or otherwise breached through mechanical contact, extremes of temperature or the like. In one embodiment, as shown in FIG. 4, the polymeric barrier may comprise a polymeric cup 128 disposed between the ceramic cap 110 and the sensing coil 104. The polymer cup 128 is generally U-shaped in cross section and extends over the sensing coil 104 and coil core 118 and longitudinally into the sensing portion 120 of the inductive proximity sensor 100 such that the sidewall 150 of the polymeric cup 128 is generally parallel with the interior surface 103 of the sensor housing 102. In one embodiment (not shown), the polymeric cup 128 is press-fit into the active end 120 of the sensor housing 102 and held in place by the frictional engagement of the sidewall 150 of the polymer cup 128 with the interior wall of the sensor housing 102.

Alternatively, when the inductive proximity sensor 100 utilizes a spacer 108 to space the sensing coil 104 from the interior wall of the sensor housing 102 as shown in FIG. 4, the polymeric cup 128 may be press fit into the sensing portion 120 of the inductive proximity sensor 102 such that the sidewall 150 of the polymeric cup 128 is disposed between the spacer 108 and the sensor coil 104 and coil core 118 and frictionally engaged with the spacer 108. The spacer 108 may be provided with a seat 134 around the interior diameter of the spacer 108 such that a rim 152 extending around the polymeric cup 128 may be positioned in the seat 134. Epoxy or other, similar adhesives may be used to secure the polymeric cup 128 to the spacer 108.

In another embodiment (not shown), the polymeric cup 128 may be integrally formed with the spacer 108 and the combination spacer/polymeric cup may be positioned over the sensing coil 104 and held in place by the frictional engagement of the spacer/polymeric cup with the interior wall of the sensor housing 102.

Referring again to FIG. 5, in another embodiment, when the ceramic cap and spacer form an integrated cap/spacer 138, the polymeric cup 128 may be inserted into the integrated cap/spacer 138 such that the sidewalls 150 of the polymeric cup 128 are substantially parallel to and frictionally engaged with the spacer portion 146 of the integrated cap/spacer 138.

It should now be understood that the inductive proximity sensors shown and described herein comprises a variety of features which make the inductive proximity sensor less susceptible to damage and/or failure. In particular, the present inventors have found that spacing the sensor coil from the housing of the inductive proximity sensor improves the sensing range of the sensing coil which, in turn, facilitates the use of a more mechanically robust housing for packaging the inductive proximity sensor. As a result, a more durable inductive proximity sensor is produced which may be deployed in a wider range of applications and environments without risk of failure due to damage.

Further, because the range of the inductive proximity sensors is improved by spacing the sensing coil apart from the housing, the inductive proximity sensors shown and described herein may also include a protective annulus surrounding the active end or sensing portion of the inductive proximity sensor such that the sensing coil and associated protective ceramic cap are recessed in the housing of the sensor. The protective annulus prevents the edges of the ceramic cap and the edges of the sensing coil from being damaged by mechanical contact. In addition, the protective annulus prevents the ceramic cap from coming in direct contact with a planar surface thereby preventing damage to the ceramic cap and subsequent damage to the sensing coil.

Finally, the inductive proximity sensors shown and described herein may include both a protective ceramic cap used in conjunction with a polymeric cap. The polymeric cap seals the sensing coil in the housing and provides an additional barrier over the sensing coil should the ceramic cap become breached, cracked or otherwise damaged through mechanical contact, thermal variations and/or the like.

The inductive proximity sensors shown and described herein may be employed in a variety of applications for sensing the distance or spacing of an electrically conductive or magnetizable object. For example, the proximity sensors shown and described herein may be used in conjunction with manufacturing and assembly lines, gear boxes, metal detectors and the like. In particular, the proximity sensors shown and described herein are particularly useful when deployed in welding applications including automated welding applications. The various features of the inductive proximity sensor make the inductive proximity sensor resistant to damage from mechanical contact, heat, weld spatter and the like.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. An inductive proximity sensor comprising a sensor housing, a sensing coil and an evaluation circuit wherein:
   the sensor housing comprises a sensing portion and a body portion;
   the evaluation circuit is electrically coupled to the sensing coil and positioned in the body portion of the sensor housing;
   the sensing coil is positioned in the sensing portion of the sensor housing such that the sensing coil is recessed from an outer edge of the sensor housing by a protective annulus disposed between the sensing coil and the outer edge of the sensor housing;
   the sensing coil is spaced apart from the sensor housing by a zone having low magnetic permeability relative to the sensor housing disposed between the sensing coil and the sensor housing and extending circumferentially around the sensing coil; and
   a protective plate is recessed from the outer edge of the sensor housing and disposed between the outer edge of the sensor housing and the sensing coil.

2. The inductive proximity sensor of claim 1 wherein the zone having low magnetic permeability relative to the sensor housing comprises an air gap disposed between the sensing coil and the sensor housing and extending circumferentially around the sensing coil.

3. The inductive proximity sensor of claim 1 wherein the zone having low magnetic permeability relative to the sensor housing comprises a material having low magnetic permeability relative to the sensor housing.

4. The inductive proximity sensor of claim 1 wherein the protective plate is integrally formed with a spacer having low magnetic permeability relative to the sensor housing such that, when the protective plate is disposed over the sensing coil, the spacer is positioned between the sensing coil and the sensor housing.

5. The inductive proximity sensor of claim 1 wherein the protective plate comprises a ceramic cap, a duromer cap or a polymer cap.

6. The inductive proximity sensor of claim 5 wherein the ceramic cap comprises a laminated ceramic cap or a fiber reinforced ceramic cap.

7. The inductive proximity sensor of claim 1 wherein the protective plate comprises a polymeric barrier and a ceramic cap wherein the polymeric barrier is disposed between the ceramic cap and the sensing coil.

8. The inductive proximity sensor of claim 7 wherein the polymeric barrier comprises a cup positioned over the sensing coil such that the cup is disposed between sensing coil and the sensor housing.

9. The inductive proximity sensor of claim 1 wherein an inner diameter of the sensing portion is greater than an inner diameter of the body portion such that a thickness of the sensor housing in the sensing portion is less than a thickness of the sensor housing in the body portion.

10. An inductive proximity sensor comprising a sensor housing, a sensing coil and an evaluation circuit, wherein:
    the sensor housing comprises a sensing portion and a body portion;
    the evaluation circuit is electrically coupled to the sensing coil and positioned in the body portion of the sensor housing;
    the sensing coil is positioned in the sensing portion of the sensor housing such that the sensing coil is recessed from an outer edge of the sensor housing by a protective annulus disposed between the sensing coil and the outer edge of the sensor housing wherein the protective annulus is provided with a seat recessed from the outer edge of the sensor housing;
    the sensing coil is spaced apart from the sensor housing by a zone having low magnetic permeability relative to the sensor housing disposed between the sensing coil and the sensor housing and extending circumferentially around the sensing coil;
    a protective plate is positioned in the seat of the protective annulus such that the protective plate is recessed from the outer edge of the sensor housing and disposed between the outer edge of the sensor housing and the sensing coil; and
    a polymeric barrier is disposed between the protective plate and the sensing coil.

11. The inductive proximity sensor of claim 10 wherein the zone having low permeability relative to the sensor housing comprises an air gap between the sensing coil and the sensor housing.

12. The inductive proximity sensor of claim 10 wherein the zone having low magnetic permeability relative to the sensor housing comprises a spacer having low magnetic permeability relative to the sensor housing.

13. The inductive proximity sensor of claim 12 wherein the spacer is provided with a seat and the polymeric barrier is disposed in the seat of the spacer.

14. The inductive proximity sensor of claim 10 wherein the polymeric barrier is a cup positioned over the sensing coil.

15. The inductive proximity sensor of claim 10 wherein an inner diameter of the sensing portion is greater than an inner diameter of the body portion such that a thickness of the sensor housing in the sensing portion is less than a thickness of the sensor housing in the body portion.

16. An inductive proximity sensor for use in conjunction with welding applications comprising a sensor housing, a sensing coil and an evaluation circuit, wherein:
    the sensor housing is substantially cylindrical in shape and is integrally formed with a body portion disposed between a sensing portion and a connector portion wherein the body portion, the sensing portion and the connector portion extend along a longitudinal axis and are concentric about the longitudinal axis;
    the connector portion comprises an isolation sleeve extending longitudinally into the body portion;
    the evaluation circuit is electronically coupled to the sensing coil and mechanically engaged with the isolation sleeve such that the evaluation circuit is fixed into position in the body portion;
    the sensing coil is mechanically engaged with the evaluation circuit thereby positioning the sensing coil in the sensing portion of the sensor housing;
    the sensing coil is positioned in the sensing portion of the sensor housing such that the sensing coil is recessed from an outer edge of the sensor housing by a protective annulus disposed between the sensing coil and the outer edge of the sensor housing wherein the protective annulus is provided with a seat recessed from the outer edge of the sensor;

the sensing coil is spaced apart from the sensor housing by a zone having low magnetic permeability relative to the sensor housing disposed between the sensing coil and the sensor housing and extending circumferentially around the sensing coil;

a ceramic cap is positioned in the seat of the protective annulus such that the ceramic cap is recessed from the outer edge of the sensor housing and disposed between the outer edge of the sensor housing and the sensing coil; and a polymeric cup is disposed between the ceramic cap and the sensing coil.

17. The inductive proximity sensor of claim 16 wherein the zone having low magnetic permeability relative to the sensor housing comprises an air gap.

18. The inductive proximity sensor of claim 16 wherein the zone having low magnetic permeability relative to the sensor housing comprises a cylindrical spacer having low magnetic permeability relative to the sensor housing.

19. The inductive proximity sensor of claim 18 wherein the spacer is provided with a seat and the polymeric cup is positioned in the seat.

20. The inductive proximity sensor of claim 16 wherein the sensor housing comprises a non-stick polymeric coating.

* * * * *